Dec. 1, 1970        G. R. SHERMAN        3,543,605
CONTROL KNOB WITH ADJUSTABLE CONNECTION MEANS
Filed May 14, 1969
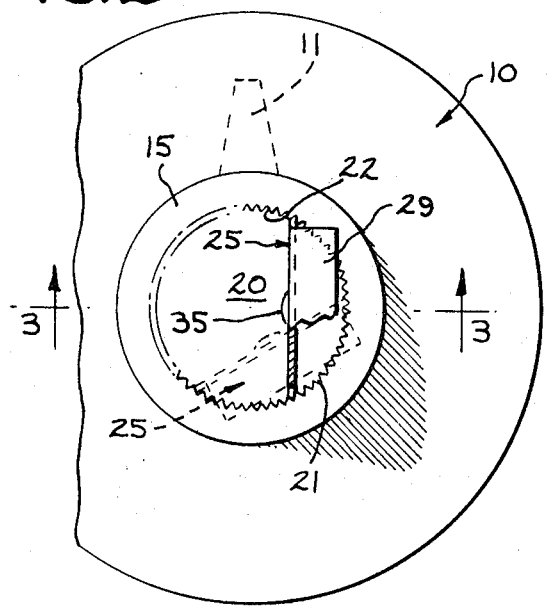
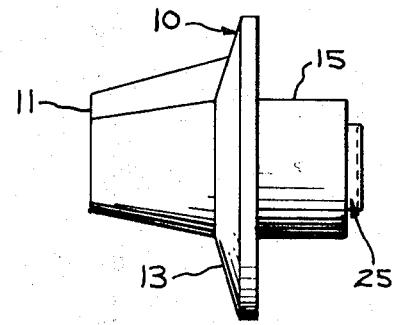
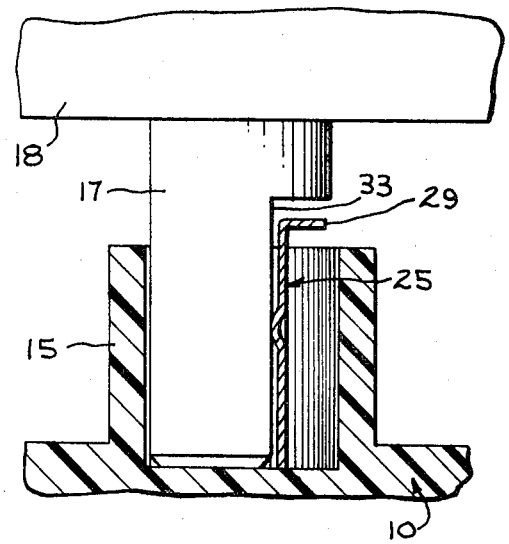
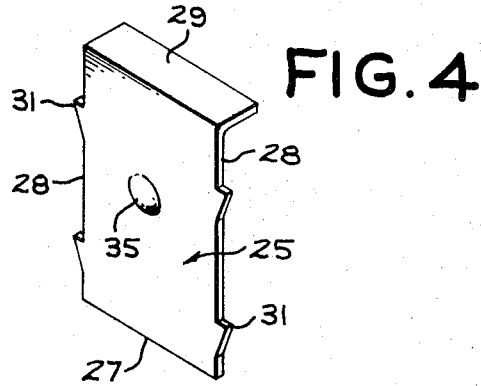
INVENTOR.
GEORGE R. SHERMAN
BY Richard L. Caslin
HIS ATTORNEY

United States Patent Office 3,543,605
Patented Dec. 1, 1970

3,543,605
CONTROL KNOB WITH ADJUSTABLE
CONNECTION MEANS
George R. Sherman, Louisville, Ky., assignor to General
Electric Company, a corporation of New York
Filed May 14, 1969, Ser. No. 824,582
Int. Cl. G05g 1/12
U.S. Cl. 74—553
5 Claims

ABSTRACT OF THE DISCLOSURE

A control knob usable on an adjustable control device such as a multiple position electric switch or a thermostat. In order to standardize the knob design for many different applications so as to reduce large inventory problems, the knob is made with an adjustable connection means so that it may accommodate many different control devices that have different orientations of the flat side of the shaft of the devices. The knob has a hollow hub with a cylindrical bore that has a plurality of longitudinal slots formed in the wall thereof. A generally flat clip member is confined between a pair of a large choice of opposing slots in the hub with an interference fit to establish a D-shaped bore for receiving the mating shaft. The clip member is capable of assembly in a plurality of different angular positions so as to be able to alter the angular relationship between the handle and the mounting shaft of the control device.

BACKGROUND OF THE INVENTION

Appliance manufacturers who make appliances that use control devices such as multiple position electrical switches and thermostats require a control knob for each device. Particular reference is made here to manufacturers of ranges, automatic washers and dryers and the like. Usually new models of appliances are introduced each year, and preferably they include different appearance designs of improved acceptability. Unfortunately, the control knobs not only differ in appearance but they also differ in construction which over the years has presented a large inventory problem for the product service technicians who are located throughout the country to repair and replace components which wear out with use or abuse.

One example in the prior art of a control knob with an adjustment and calibration means is the patent of Kermit B. Keeling, Sr. and Howard B. Baughman No. 3,176,541 which is assigned to the General Electric Company, the assignee of the present invention. This patent discloses a knob design where it is possible to alter the relative position of the temperature dial with respect to the flat of the D-shaped shaft of the control device. However it is not possible to alter the relative position of the handle portion 16 of the knob with respect to the flat of the shaft.

The principal object of the present invention is to provide a control knob with a simple, reliable mounting means for the hub of the knob for establishing a D-shaped bore in the hub at a plurality of alternate angular relationships.

A further object of the present invention is to provide a control knob with an adjustable mounting means for connection with the shaft of a control device for altering the relative position of the handle portion of the knob with respect to the supporting shaft of the control device.

A further object of the present invention is to provide a control knob with an adjustable means for mounting the knob on its supporting shaft at a plurality of alternate angular relationships between the handle of the knob and the shaft of the control device.

A still further object of the present invention is to provide a control knob with an adjustable clip member for changing the relative position of the knob with respect to its supporting shaft, where the clip member is adapted to be fixed with respect to the knob against inadvertent removal therefrom.

SUMMARY OF THE INVENTION

The present invention, in accordance with one form thereof, relates to a control knob with a handle portion and a hub that has a cylindrical bore. The bore of the hub has a plurality of longitudinal slots formed in the wall thereof to create alternate pairs of opposing slots that receive a clip member in a plurality of possible angular relationships so as to form a D-shaped bore for receiving the shaft of a control device such as a multiple position switch or a thermostat.

BRIEF DESCRIPTION OF THE DRAWINGS

My invention will be better understood from the following description taken in conjunction with the accompanying drawings and its scope will be pointed out in the appended claims.

FIG. 1 is a right side elevational view of a control knob embodying the present invention.

FIG. 2 is a fragmentary rear view on an enlarged scale of the control knob of FIG. 1 looking into the cylindrical hub of the knob to see the plurality of longitudinal slots formed in the wall of the bore of the hub and illustrating the manner in which an adjustable clip member is held between a pair of opposing slots.

FIG. 3 is a fragmentary cross-sectional view taken through the hollow hub of the knob on the line 3—3 of FIG. 2.

FIG. 4 is an isometric view of the clip member which is insertable into the bore of the hub with a forced fit.

DESCRIPTION OF THE PREFERRED EMBODIMENT

Turning now to a consideration of the drawings and in particular to FIG. 1 there is shown a control knob 10 having a handle portion 11 with a skirt or dial 13 formed therewith as well as a hollow cylindrical hub 15 on the back side thereof. This invention is centered around the method of connecting the hub 15 of the knob 10 with a supporting shaft 17 of a control device 18 as is seen in FIG. 3. The exact design or appearance of the handle portion 11 and dial 13 of the knob is not critical to the practice of the present invention.

This invention can best be understood by studying FIG. 2 which shows the back side of the knob 10 with the hollow cylindrical hub 15 having a central bore 20 that is provided with a plurality of longitudinal slots 22 in their inner wall 21 forming the bore. These slots 22 are of such a narrow size that they are arranged in complementary pairs of opposed slots that are adapted to receive a flat clip member 25 as is shown in detail in FIG. 4. This clip member 25 is of simple planar construction of generally rectangular form having a bottom edge 27, opposite side edges 28 and a top edge that is folded over to form a head or flange 29. This clip member 25 is adapted to be slid between a pair of opposed slots 22 with a forced fit so that once the clip is in place it cannot inadvertently be dislocated. To insure such a result the opposite side edges 28 of the clip are formed with locking members or barbs 31 which are capable of digging into the molded plastic material of the hub 15 of the knob. Other acceptable materials for the knob are aluminum and zinc. It is preferable that the clip member 25 be held in place so tightly that it is not possible to withdraw it with a bare hand. This explains the reason for the head or flange 29 which is adapted to project in a direction outwardly from the center of the hub to enable a screwdriver blade or the like to be inserted beneath it and leverage applied by the screwdriver for prying the clip out of the hub. Notice that the presence of the clip member 25 in the bore 20 of the hub establishes a D-shaped opening or bore for receiving the shaft 17 of the control device 18. Such a shaft has a flat 33 in one side thereof formed by cutting away one side and thereby establishing the D-shaped cross-section of the clip of the shaft 17.

A small embossment 35 is formed in the side of the clip member 25 facing the center of the bore 20 of the hub and this creates a forced fit with the tip of the shaft 17 within the D-shaped bore of the hub for a springing engagement between the tip of the shaft and the hub.

Modifications of this invention will occur to those skilled in this art, therefore it is to be understood that this invention is not limited to the particular embodiments disclosed but that it is intended to cover all modifications which are within th e true spirit and scope of this invention as claimed.

What I claim as new and desire to secure by Letters Patent of the United States is:

1. A control knob for connection with a mounting shaft of an adjustable control device which may be manipulated by rotation of said knob, the knob having a handle portion and a hub with a cylindrical bore, the bore of the hub having a plurality of longitudinal slots formed in the wall thereof, and a clip member inserted into the bore of the hub and held in place by being slid into engagement with opposing slots so as to form a D-shaped bore, the said clip member being adjustable into a number of angular relationships with respect to the handle portion of the knob.

2. A control knob as recited in claim 1 wherein the said clip member is of simple planar configuration and has an interference fit in the supporting slots, the outermost end of the clip member having an engaging portion to facilitate the removal of the clip member from the hub so that it may be repositioned in an alternate set of supporting slots.

3. A control knob as recited in claim 2 wherein the opposing side edges of the clip member include locking means for positive engagement in the supporting slots, and the addition of a protrusion on the side of the clip member nearest the center of the bore of the hub adapted for exerting a tightening action on the flat of a mating D-shaped mounting shaft.

4. A control knob having a handle with a hollow cylindrical hub arranged to receive an operating shaft of an associated control device which is to be adjusted by rotation of said knob, the hub having a bore with an inner wall formed with a plurality of longitudinal slots which are arranged in opposing pair, and a clip member slid into the bore of the hub with the opposing side edges of the clip member confined in an opposing pair of longitudinal slots, said opposing side edges of the clip member including locking means for positive engagement in the slots, and a prying means formed on the outermost end of the clip member to facilitate the removal of the clip member for changing the relative position of the clip member with respect to the handle of the knob.

5. A control knob as recited in claim 4 wherein the said locking means on the opposing side edges of the clip member include at least one bar for an interference fit in the related slot.

References Cited
UNITED STATES PATENTS

| | | | |
|---|---|---|---|
| 3,271,057 | 9/1966 | Kimbro | 287—53 |
| 3,396,604 | 8/1968 | Samuels et al. | 287—53 XR |

FRED C. MATTERN, Jr., Primary Examiner

F. D. SHOEMAKER, Assistant Examiner

U.S. Cl. X.R.

74—548; 287—53